United States Patent
Babu et al.

(10) Patent No.: US 7,159,144 B2
(45) Date of Patent: Jan. 2, 2007

(54) FIRMWARE CODE PROFILING

(75) Inventors: Satheesh Babu, Trivandrum (IN); Santosh Savekar, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 579 days.

(21) Appl. No.: 10/600,243

(22) Filed: Jun. 20, 2003

(65) Prior Publication Data
US 2004/0260913 A1    Dec. 23, 2004

(51) Int. Cl.
*G06F 11/00* (2006.01)

(52) U.S. Cl. ............................ 714/35; 714/34; 714/45; 717/130

(58) Field of Classification Search ................ 714/35, 714/30, 34, 45; 717/130; 712/227
See application file for complete search history.

(56) References Cited

U.S. PATENT DOCUMENTS

| | | | | |
|---|---|---|---|---|
| 5,355,487 A | * | 10/1994 | Keller et al. ................. | 717/127 |
| 5,768,500 A | * | 6/1998 | Agrawal et al. .............. | 714/47 |
| 5,784,554 A | * | 7/1998 | Hsiung ........................ | 714/45 |
| 6,233,678 B1 | * | 5/2001 | Bala ........................... | 712/240 |
| 6,728,949 B1 | * | 4/2004 | Bryant et al. ................ | 717/127 |
| 2004/0163077 A1 | * | 8/2004 | Dimpsey et al. ............ | 717/130 |

OTHER PUBLICATIONS

McCanne, Steven and Chris Torek, A Randomized Sampling Clock for CPU Utilization Estimation and Code Profiling, Jan. 1993, Winter USENIX conference 1993, pp. 2-3.*

* cited by examiner

*Primary Examiner*—Robert Beausoliel
*Assistant Examiner*—Marc Duncan
(74) *Attorney, Agent, or Firm*—McAndrews Held & Malloy Ltd.

(57) ABSTRACT

Disclosed herein are debugging tool(s) for profiling the frequency of execution of certain instructions in a host operation. The debugging tool causes interrupts to occur at random time intervals and records the address of the program counter at each interrupt. A profile is developed that indicates the frequency of execution of certain instructions after a statistically significant number of interrupts.

8 Claims, 4 Drawing Sheets

FIRMWARE CODE PROFILING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Integrated Circuits (ICs) and Application Specific Integrated Circuits (ASICs) usually perform a function using a combination of programmable hardware and software. For example, a processor or controller can be embedded into an IC (now collectively referring to ICs and ASICs). The operations or functionality of the circuits can be achieved by a set of instructions that are executable by the processor or controller and stored in a memory. The instructions form a program that is often referred to as firmware.

ICs are often integrated other hardware on a motherboard to form end products. As such, the manufacturer of the IC and the end product are quite likely to be different engineering teams, if not different companies, altogether. The manufacturer of the end product usually must design the interface of the hardware that is placed on the motherboard.

For that purpose, it is desirable that the IC have on-chip debugging tools for testing during integration onto the motherboard. However, on-chip debugging tools add additional firmware and require additional memory for storage. Memory requirements for storing firmware in many cases is the most important factor that determines the cost of the IC. Accordingly, on-chip debugging tools can potentially add significant costs to the IC.

Additionally, it is also important that the debugging suite does not reduce the processing capabilities of the IC during regular operation of the host function. In many cases, the host function of the IC is required to operate in real-time. During regular operation of the IC, a reduction of the processing capabilities can severely hamper the goal of real-time operation.

Another factor for debugging tools is that the debugging tool have minimal interaction with the host function. Ideally, the debugging tool should be seamless from the perspective of the host function. Excessive interaction with the host function can complicate the task of integrating the IC into an end product.

One scheme for debugging is to instrument the course code with labeled points and compile the source code. When the code is being executed and a particular label point is reached, the execution status is marked in a table or by setting a bit in a vector. However, instrumenting the source code is a tedious task. Additionally, the associated code and data space occupancy of the instrument code can be come prohibitively high for an embedded scenario. Also, the execution time of the instrument code might affect real-time performance.

In another scheme, an external agent monitors the executed instruction's address either continuously or at regular intervals. However, the monitoring frequency and the monitoring path can affect the performance as well as the quality of results.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Presented herein are a system(s), method(s), and apparatus for firmware code profiling. In one embodiment, there is presented a method for profiling the frequency that particular ones of a plurality of instructions are executed. The method comprises generating an interrupt, storing an address in a program counter at the time of the interrupt, and updating a profile with the address in the program counter at the time of the interrupt.

In another embodiment, there is presented an instruction memory storing a plurality of instructions. The instruction memory comprises a host operation, and an interrupt subroutine. The interrupt subroutine further comprises a debugging tool. The host operation performs a host function and comprises a first plurality of instructions. The interrupt subroutine interrupts the host function. The debugging tool profiles the relative frequency that particular instructions of the first plurality of instructions are executed.

In another embodiment, there is presented an integrated circuit for performing a host function. The integrated circuit comprises a first memory, a processor, a timer, and a second memory. The first memory stores a host operation comprising a first plurality of instructions. The processor executes the first plurality of instructions. The timer interrupts the processor. The second memory stores an interrupt subroutine, wherein the processor executes the interrupt subroutine after the timer interrupts the processor. The interrupt subroutine comprises a debugging tool and logic. The debugging tool measures the relative frequency that particular instructions of the plurality of instructions are executed. The logic selectively invokes the debugging tool.

These and other advantages and novel features of the present invention, as well as details of illustrated embodiments thereof, will be more fully understood from the following description and drawings.

DETAILED DESCRIPTION OF THE INVENTION

Figure 1:
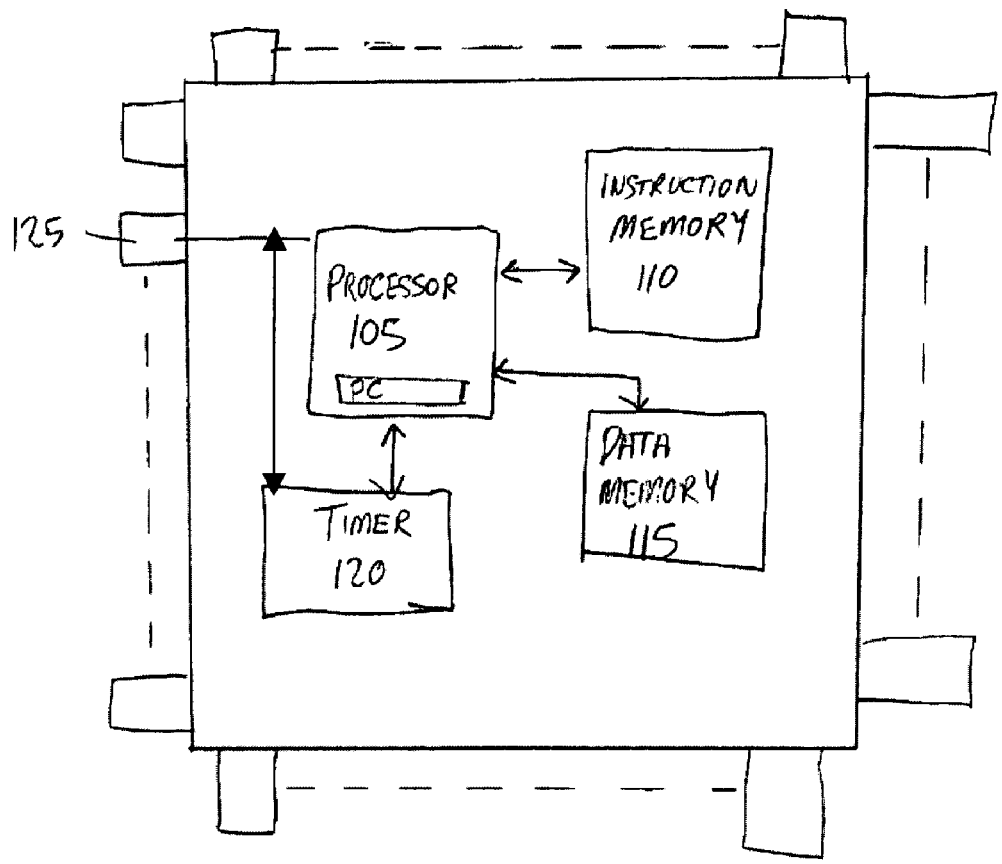
FIG. 1 is a block diagram of an exemplary integrated circuit in accordance with an embodiment of the present invention.

Referring now to FIG. 1, there is illustrated a block diagram describing an exemplary integrated circuit 100 in accordance with an embodiment of the present invention. The integrated circuit 100 comprises a processor 105, an instruction memory 110, a data memory 115, a timer 120, and any number of pins 125.

The integrated circuit 100 performs a particular host operation that is implemented as a set of instructions in the instruction memory 110 that are executed by the processor 105. The instruction memory 110 comprises a non-volatile memory, such as read only memory (ROM), Programmable ROM (PROM), Erasable PROM (EPROM), or Electrically Erasable PROM (EEPROM), for example. The instruction memory 110 stores instructions that form a firmware debugging tool. The firmware debugging tool generates a statistical profile that measures the frequency that instructions are executed with respect to each other within the host operation.

The processor 105 includes a program counter PC. The program counter PC stores the address of the instruction executed by the processor 105. At the beginning of an instruction execution cycle, the processor 105 fetches the instruction at the address indicated by the program counter PC. At the completion of an instruction cycle, the processor 105 updates the program counter PC with the address of the next instruction for execution.

The firmware debugging tool can be stored as part of an interrupt subroutine and enabled by an enabling signal on a particular one of the pins 125. The interrupt subroutine is triggered by the expiration of the timer 120. The timer 120 is enabled by the enabling signal at the particular pin 125. The interrupt subroutine can also be triggered by other events. The timer 120 is a backward counting timer that generates an interrupt to the processor 105. Responsive to receiving the interrupt, the processor 105 stores the context, including the contents of the program counter PC in the data memory 115. For example, contents of the program counter PC and the context can be stored in a data structure known as a stack. At the completion of the interrupt subroutine, the processor 105 retrieves the contents of the program counter PC stored in the data memory 115 loads the contents back into the program counter PC.

After the processor 105 receives the interrupt, the interrupt subroutine invokes the debugging tool. The debugging tool maintains a profile in the data memory 115 that measures the frequency that particular instructions are executed. When the interrupt subroutine invokes the debugging tool updates the profile with the address in the program counter PC that was stored responsive to receiving the interrupt. The debugging tool also generates a pseudo-random number and loads the timer 120 with a value that is a function of the pseudo-random number.

In one embodiment, the pseudo-random number itself can be a function of the address in the program counter PC at the time of the interrupt. The PC (at the time of timer-interrupt) is taken into account in forming the pseudo-random number (PRN) because the program flow is a deterministic cause-effect sequence, in contrast to a random sequence. After each instruction, there is at least a short-range view of the next instruction to be executed. Hence, it is advantageous to use of the PC value at the time of the timer interrupt to determine the pseudo-random number for when the timer interrupt should trigger again.

After the debugging tool loads the timer 120 with the pseudo-random number, the processor 105 returns from the interrupt subroutine to the host operation.

The debugging tool provides a profile that measures the frequency that certain instructions in the host operation are executed. An enable signal can be asserted at the pin 125 and the processor 105 can execute the host operation until a statistically significant number of timer 120 generated interrupt occurs.

Additionally, the timer 120 can be loaded with a predetermined initial value. The timer 120 can be programmed in one of a number of ways, such as via access to one of the pins 125. Alternatively, the code sequence executed at power up can include code that examines the pin 125 for an enabling signal. If the enabling signal is present, the start up code allows the user to set an initial timer value. Additionally, the code can allow the user to provide a scaling parameters. The scaling parameter can be set to adjust the mean or expectation time period between interrupts.

Figure 2:
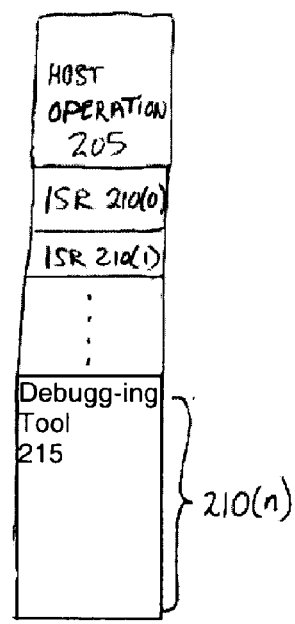
FIG. 2 is a block diagram describing the software architecture of the firmware in accordance with an embodiment of the present invention.

Referring now to FIG. 2, there is illustrated a block diagram of the firmware architecture of instruction memory 110. The instruction memory 110 stores the host operation 205, interrupt subroutines 210(0) . . . 210(n), and the debugging tool 215. The processor 105 executes the host operation 205. However, when the processor 105 receives an interrupt, the processor 105 jumps to the interrupt subroutine 210(0) . . . 210(n) corresponding to the level of the interrupt. The timer 120 generates an interrupt with a particular level, such as the highest level interrupt, level n.

Upon generation of the interrupt by the timer 120, the processor 105 jumps to the interrupt subroutine 210(n). The interrupt subroutine 210(n) includes the debugging tool 215

Figure 3:
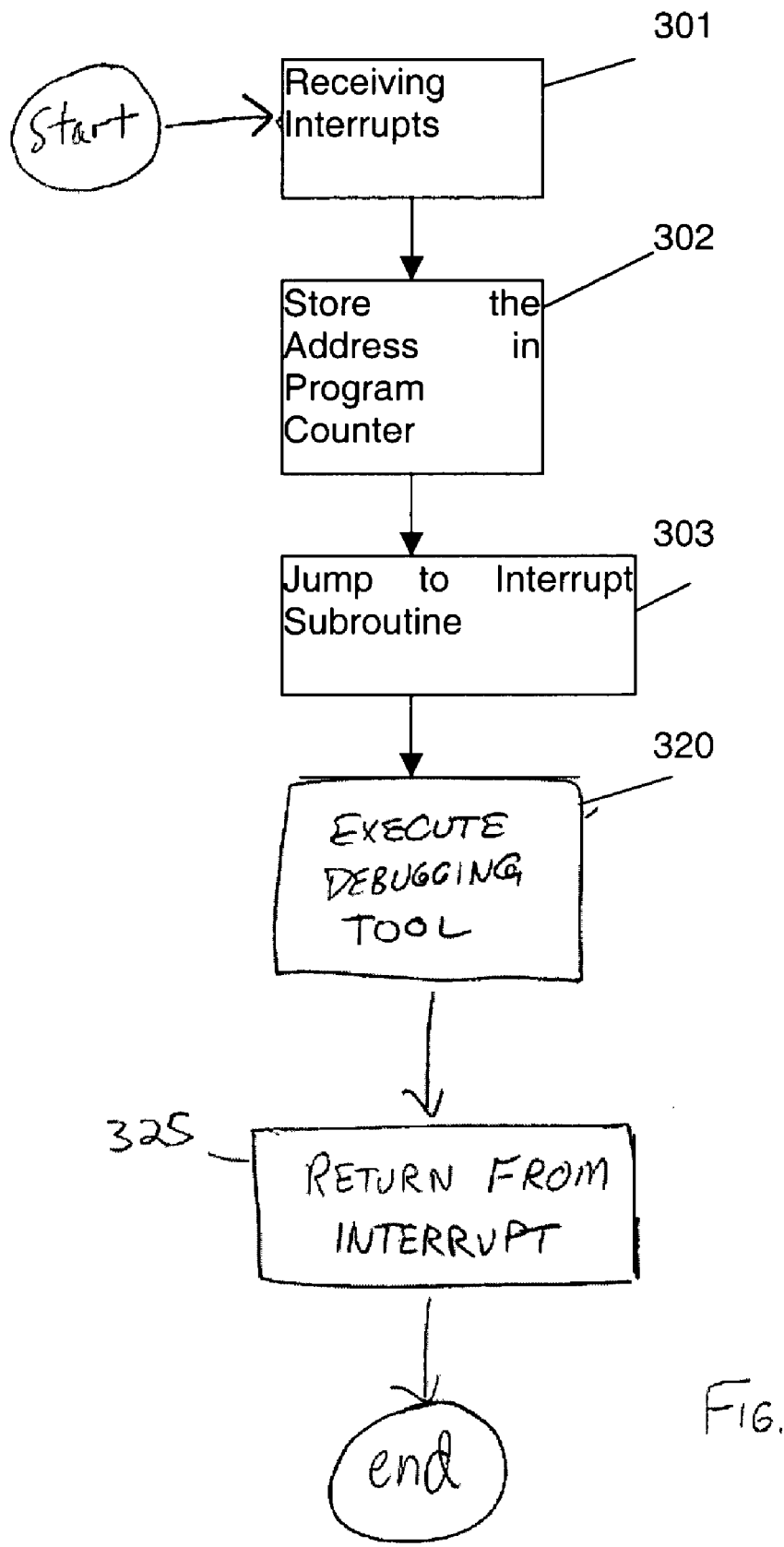
FIG. 3 is a flow diagram for the interrupt subroutine in accordance with an embodiment of the present invention.

Referring now to FIG. 3, there is illustrated a flow diagram describing the operation of the processor 105 in accordance with an embodiment of the present invention. Upon receiving the interrupt (at 301), the processor 105 stores (302) the address in the program counter PC and jumps (303) to the interrupt subroutine 210(n). The interrupt subroutine causes the debugging tool 215 to be executed (320). After the execution of the debugging tool 215, the processor 105 returns from interrupt (325).

Figure 4:
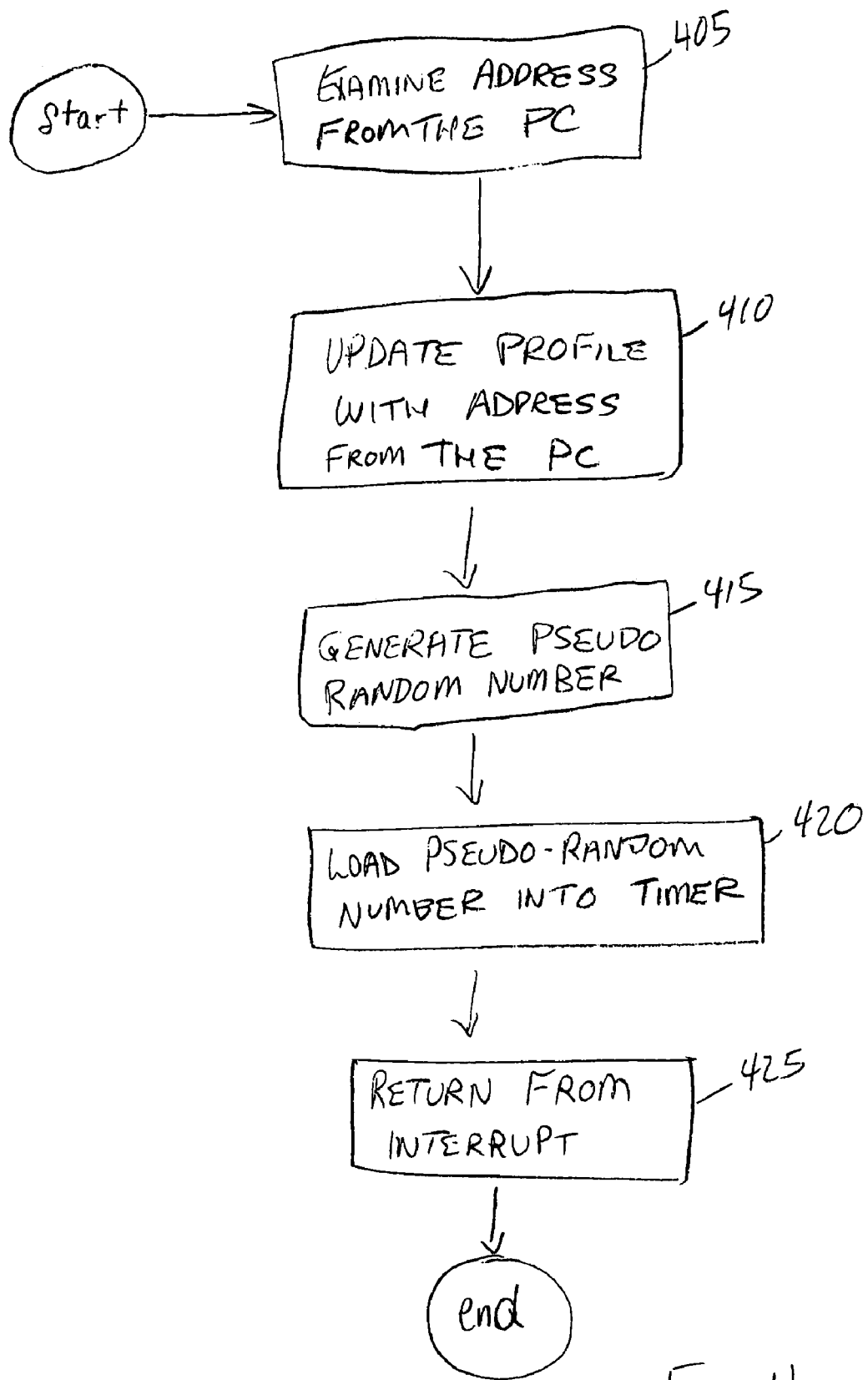
FIG. 4 is a flow diagram for the debugging tool in accordance with an embodiment of the present invention.

Referring now to FIG. 4, there is illustrated a flow diagram for the debugging tool 215b. At 405, the debugging tool 215b examines the address from the program counter PC that is stored in the data memory 115 and updates the profile (410) with the address. At 415, a pseudo-random number that is a function of the address in the program counter PC at the time of the interrupt is generated. At 420, a value that is a function of the pseudo-random number is loaded into the timer 120. For example, the value can be the pseudo-random number. For example, the value can be the pseudo-random number multiplied by a scaling factor to adjust the time period between interrupts. Upon loading the timer 120, the processor 105 returns (425) from the interrupt subroutine 210(n).

Figure 5:
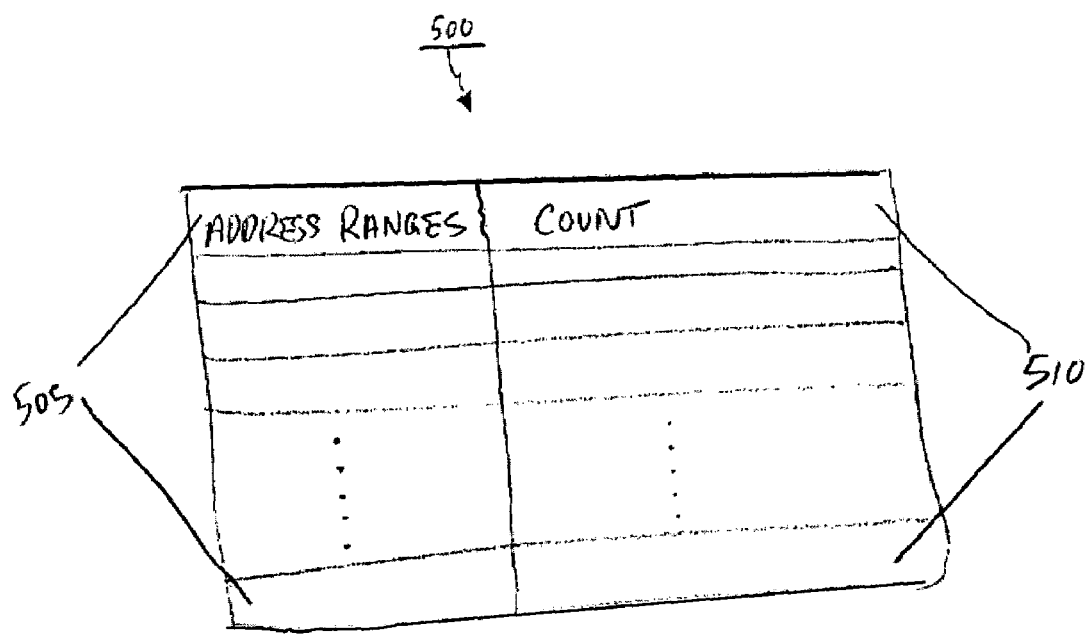
FIG. 5 is a block diagram describing a profile in accordance with an embodiment of the present invention.

Referring now to FIG. 5, there is illustrated a block diagram describing an exemplary profile in accordance with an embodiment of the present invention. The profile 500 is a data structure that is stored in the data memory 115. The profile 500 comprises a plurality of address ranges 505. Each of the address ranges 505 are associated with a count 510. In one embodiment, the address ranges 505 comprise logical portions of the host operation 205. For example, the address ranges 505 can comprise the address range for a particular function or subroutine.

The count 510 is a running tally of the number of times that the program counter PC stores an address in the address range 505 during invocation of the debugging tool 210b. At the beginning of the profiling, each count 510 is reset to zero. Each time the debugging tool 210b is invoked, the contents of the program counter PC are used to update the profile (410). Updating the profile can include, for example, incrementing the count 510 for the address range 505 that comprises the contents of the program counter PC at the time of the interrupt.

The foregoing profile can be accessed in a number of different ways. For example, the host operation 205, itself, can include code that accesses the profile. Alternatively, an additional interrupt can be generated by detection of a falling edge on the pin 125. The interrupt can be handled by an additional interrupt subroutine 210 that provides access to the profile.

The foregoing represents a scheme for profiling the frequency of execution of certain instructions over a statistically significant number of timer 120 based upon interrupts. The debugging tool 215b utilizes a relatively short number of instructions for storage in the instruction memory 110. Additionally, because the debugging tool is incorporated into an interrupt subroutine 210(n), and not executed unless the enable signal is received at the pin 125, there is minimal degradation of the processing power of the integrated circuit 100 during execution of the host operation. Additionally, there is also minimal interaction between the host operation 205 and the debugging tool 210.

While the invention has been described with reference to certain embodiments, it will be understood by those skilled in the art that various changes may be made and equivalents may be substituted without departing from the scope of the invention. In addition, many modifications may be made to adapt particular situations or materials to the teachings of the invention without departing from its scope. Therefore, the invention is noted limited to the particular embodiment(s) disclosed, but that the invention will include all embodiments falling within the scope of the claims.

The invention claimed is:

1. A method for profiling the frequency that particular ones of a plurality of instructions are executed, said method comprising:
   generating an interrupt;
   storing an address from a program counter at the time of the interrupt;
   generating a pseudo-random number after generating the interrupt;
   loading a timer with a value that is a function of the pseudo-random number and a user provided parameter; and
   updating a profile with the address from the program counter.

2. The method of claim 1, wherein the pseudo-random number is also a function of the address from the program counter.

3. The method of claim 1, wherein updating the profile further comprises: incrementing a count associated with an address range, the address range comprising the address in the program counter.

4. An instruction memory storing a plurality of instructions, said plurality of instructions comprising:
   a host operation for performing a host function, the host operation comprising a first plurality of instructions; and
   an interrupt subroutine for interrupting the host function, said interrupt subroutine comprising:
   a debugging tool for profiling the frequency that particular instructions of the first plurality of instructions are executed, wherein the debugging tool further comprises a second plurality of instructions, said second plurality of instructions further comprising:
      updating a profile with the address in the program counter at the time of the interrupt;
      generating a pseudo-random number after generating the interrupt; and
      loading a timer with a value that is a function of the pseudo-random number and a user-provided parameter.

5. The instruction memory of claim 4, wherein the pseudo-random number is also a function of the address from the program counter.

6. An integrated circuit for performing a host function, said integrated circuit comprising:
   a first memory for storing a host operation comprising a first plurality of instructions, a processor for executing the first plurality of instructions; a timer for interrupting the processor; and
   a second memory for storing an interrupt subroutine, the processor executing the interrupt subroutine after the timer interrupts the processor; and
   the interrupt subroutine comprising:
   a debugging tool for measuring the frequency that particular instructions of the plurality of instructions are executed, wherein the debugging tool further comprises a second plurality of instructions, the second plurality of instructions comprising:
      updating a profile with the address in the program counter at the time of the interrupt;
      generating a pseudo-random number after generating the interrupt; and
      loading a timer with a value that is a function of the pseudo-random number and a user-provided parameter.

7. The integrated circuit of claim 6, wherein updating the profile further comprises:
   incrementing a count associated with an address range, the address range comprising the address in the program counter.

8. The integrated circuit of claim 6, wherein the pseudo-random number is also a function of the address from the program counter.

* * * * *